INVENTORS
BRUCE B. CLEVELAND
THOMAS P. DOUGAN

INVENTORS
BRUCE B. CLEVELAND
THOMAS P. DOUGAN

United States Patent Office 3,832,263
Patented Aug. 27, 1974

3,832,263
THERMAL INSULATING BARRIER OF
CELLULAR POLYMER BLOCKS
Bruce B. Cleveland, San Pedro, and Thomas P. Dougan,
Corona Del Mar, Calif., assignors to The Upjohn Company, Kalamazoo, Mich.
Continuation of abandoned application Ser. No. 141,775,
May 10, 1971. This application Mar. 26, 1973, Ser. No.
344,888
Int. Cl. B32b 3/16, 31/10
U.S. Cl. 161—37                1 Claim

ABSTRACT OF THE DISCLOSURE

A thermal insulating barrier is provided which can be folded into compact form for transportation, and which is especially useful in fabricating foundations for roads, runways, buildings and the like, on permafrost or any terrain which is subject to periodic thawing. The barrier comprises a plurality of rigid cellular polymer blocks each of which is encased in a form-fitting envelope of water-impervious film (e.g. polyethylene). The skin covered blocks are joined one to another by, for example, heat welding the edge of skin along the longitudinal edges of one block to the corresponding skin edge on the neighboring blocks. The connections between blocks serve to hold them in parallel relationship but also act as hinges about which the barrier can be folded into compact form. In a preferred embodiment, the rigid cellular polymer blocks are substantially rectangular and the blocks are joined via the skin at diametrically opposed edges. The resulting barrier can then be folded in accordion pleat-like fashion into a compact portable form for transportation.

CROSS REFERENCE TO RELATED APPLICATION

This application is a continuation of our copending application Ser. No. 141,775 filed May 10, 1971, now abandoned.

BACKGROUND OF THE INVENTION

Field of the Invention

This invention relates to thermal barriers for use in the construction of foundations for load bearing structures and is more particularly concerned with improved cellular polymer thermal barriers for use in foundations for load bearing structures which are to be installed on permafrost and like terrain.

Description of the Prior Art

The discovery of oil in remote areas subject to extremes of temperature such as in northern Alaska has brought with it a host of problems related to the housing of personnel and equipment and to the transportation of essential supplies into the area and of the oil out of the area. Many of these problems are related to the difficulties of building stable foundations for load bearing structures on terrain which remains frozen for the major period of a calendar year but which is subject to thawing during the brief summer months. This problem, so far as it relates to roads, airport runways and the like constructions, has been approached in a number of ways. For example, U.S. Pat. 3,279,334 describes a method of maintaining the ground beneath a road in permanently frozen condition by inserting a thermal insulation barrier between said surface (while in frozen condition) and the roadbed. Sheet piles are also inserted along the sides of the insulating material and roadbed to exclude thawed material during the period of thawing.

In U.S. Pat. 3,250,188 there is disclosed a very similar result using a thermal barrier to pressure unfrozen ground in a frost-free state by excavating to a point at which unfrozen soil is exposed, covering said soil with the thermal barrier and installing the roadbed and road on top of the barrier.

In the case of both the above methods, the thermal insulating barrier is advantageously a rigid cellular polymer such as a rigid polyurethane foam, polystyrene foam and the like. It has been found in practice that it is necessary to install a vapor impermeable barrier around the rigid cellular polymer layer of the roadbed in order to prevent deterioration of the said layer by entry of moisture into the foam followed by freezing. This means that it is necessary to take to the site of the building operation, (a) the cellular foam, usually in the form of precut blocks which have to be protected against damage by moisture freezing therein during storage and transportation and (b) a vapor permeable barrier such as polyethylene, polypropylene and like sheet material. Alternatively, the cellular foam can be produced and poured or sprayed in situ from the appropriate chemical foam forming mixture. In either instance it is necessary to install the vapor barrier over the ground, place or pour the polymer foam on top of the barrier, place a second layer of barrier on top of the foam layer and seal the edges of the upper and lower layers of the vapor barrier to prevent access of moisture to the foam layer. This is a time consuming and difficult task particularly when carried out under conditions such that the ground on which the thermal barrier is to be placed is covered with thawed material which has to be removed.

We have now provided a means whereby the thermal barrier, to be used in preparing foundations for load bearing structures on surfaces which are subject to periodic thawing, can be prefabricated with a vapor barrier skin already installed and in such a fashion that it is readily transported with minimal space requirement and can be readily installed at the building site regardless of the prevailing climatic conditions.

SUMMARY OF THE INVENTION

This invention in its broadest aspect comprises a thermal insulating barrier which is adapted to be convertible from a planar configuration to a compact portable foam, which barrier comprises in combination:

(a) a plurality of blocks of rigid cellular polymer;
(b) each of said blocks being completely encased in individual envelopes of water-impervious film;
(c) each of said envelopes being hingably attached at each of its two opposite longitudinal edges to the corresponding edges of each of the neighboring envelopes;

whereby the said blocks are held in sealed substantially parallel relationship and are adapted to be brought into a compact arrangement by folding said barrier sequentially about said hingeable attachments.

The invention also comprises foundations for load-bearing structures having the aforesaid thermal insulating barriers installed therein.

DETAILED DESCRIPTION OF THE INVENTION

Figure 1:
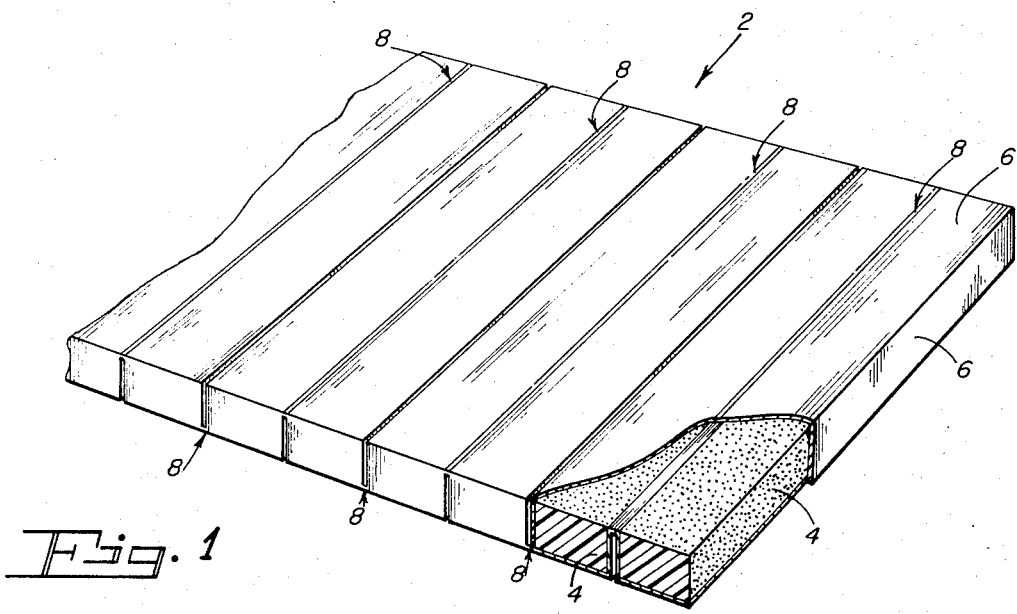
FIG. 1 is a partial cutaway perspective view of a thermal insulating barrier of the invention.

The rigid cellular polymers which are employed in preparing the thermal insulating barrier of the invention, can be any of the rigid cellular polymers known in the art of thermal insulation. Such polymers include polyurethane, polystyrene, polyurea, polyamide, polyisocyanurate, and polyimide foams and the like. Rigid polyurethane foams are the preferred insulating foams because of their resistance to fungus and insect damage, low moisture absorbence, low vapor permeability, low K factor, structural strength, and ease of preparation by a variety of techniques.

Methods for the preparation of the above types of foam are well known in the art and do not need detailed description herein; see, for example, Kirk-Othmer, Encyclopedia of Chemical Technology, 2nd Edition, Vol. 9, pages 847–884, and Saunders and Frisch, Polyurethanes; Chemistry and Technology, Vol. XVI, Part II, Interscience, 1964, pages 193–298. Various fillers can be incorporated into said foams either to improve strength, or to improve thermal insulation or merely to lower costs of producing the foams. Illustrative of such fillers are cork, expanded perlite, vermiculite, expanded glass, fiber glass, mineral wool, aluminum flake, silica, asbestos and the like.

The density of the rigid cellular polymer foam employed in the thermal insulating barriers of the invention is advantageously from about 1.5 pcf. to about 8 pcf. and preferably is from about 2 pcf. to about 6 pcf.

The rigid cellular polymer foam blocks employed in the barriers of the invention are fabricated either by cutting or by molding in the appropriate shape. Advantageously, said blocks are substantially rectangular in shape with the longest dimension corresponding to the actual width, or an appropriate fraction thereof, of the foundation to be insulated. The requisite thickness of the said blocks will vary according to the type of insulating foam used, the location in which the thermal insulating barrier is to be installed, and the manner in which it is utilized. Thus, in the case of a thermal insulating barrier which is to be installed directly on permafrost and is to be used to prevent thremal energy reaching the permafrost in sufficient quantities to affect the stability of the permafrost, the desired thickness of any particular cellular polymer necessary to provide such protection can be readily calculated using the equations and considerations set forth in the aforesaid U.S. Pat. 3,279,334. Similarly, where the thermal barrier is to be installed on nonfrozen grounds and is to be used to prevent frost penetration of said ground then the minimum desired thickness of the thermal barrier can be readily determined using the equations and considerations set forth in the aforesaid U.S. Pat. 3,250,188.

As an example of the requisite thickness of the foam block of the thermal insulating barriers of the invention, it can be said that where said foam block is fabricated from a rigid polyurethane foam of density of about 3 pcf. and a K factor of about 0.15, it is generally found that a block of thickness 3" to 4" is adequate, when interposed between a load bearing foundation and the surface of the permafrost, to keep said permafrost in stable condition even during the warmer months of the year when the air temperature averages about 60° F.

As stated previously, the individual foam blocks employed in the thermal insulating barriers of the invention are advantageously rectangular and substantially symmetrical so that when placed in edge abutting relationship on a flat surface said blocks form substantially one continuous layer of cellular polymer with minimal gaps and voids between the abutting surfaces of the foam. However, as will be obvious to one skilled in the art, the precise configuration of the individual blocks can vary considerably without departing from the desired result. For example, the abutting edges of the various foam blocks can be curved so that a concavely curved edge on one block can cooperate with a correspondingly convexly curved edge on the neighboring block. Other variations in edge configuration of the blocks will be apparent to one skilled in the art.

In fabricating the thermal insulating barriers of the invention, each of the individual blocks of polymer foam is then totally encased in an envelope or jacket of film or sheet material which is impervious to penetration by water. Examples of such material are polyethylene, polypropylene, polyurethane, polyvinyl chloride and the like. Advantageously, said material is flexible and preferably said material is weldable by application of heat. This encasement of the individual cellular blocks can be accomplished by wrapping each block individually in a sheet of the covering material and sealing all the edges by heat crimping (where possible) or by application of adhesives, sealants and the like. When the blocks are encased separately in this manner, means is provided at one or a plurality of places along the longitudinal edges of the covered block for attaching said edge to the corresponding edge of a second block so as to unite a plurality of covered blocks in parallel relationship in a barrier of the invention. Said means for attaching the covered blocks together can take the form of a single continuous projecting strip of the covering material or a plurality of small projecting strips of said material. Attachment of such strip or strips to corresponding projecting strips along the edge of a second block can be achieved by heat welding or by riveting or use of adhesives, or like means. Preferably, the covering material and the means of attachment are such that the individual blocks are flexibly hinged about the attaching means.

In a preferred method of encasing the foam blocks in the water-impervious skins, a continuous sheet of the latter having a width greater than the length of the foam blocks is laid down on a flat surface and the individual foam blocks are assembled on said sheet in the arrangement desired in the finished thermal insulating barrier, i.e. in edge to edge abutting relationship with longitudinal axes parallel and with not more than about ¼ to ½ inches separating the abutting edges of the blocks.

After assembly of the blocks in this manner, a second sheet of water impervious film is then placed over the assembled blocks without disturbing the relationship of the blocks one to another. The upper and lower sheets are then secured to each other in sealing fashion along all the outer edges of the barrier and also between the abutting edges of each block of foam so that each block is isolated from the others within an individual sealed envelope of its own. In the case of heat weldable material, the sealing is readily effected using standard heat crimping procedures.

Sealing can also be achieved using appropriate adhesives, clamps and the like, but the heat welding method is preferred.

Whichever method of encasing the polymer foam blocks in water-impervious film is adopted, the preferred site for attachment of the skin of the individual blocks to each other is at, or near, the corner edges of the said blocks. Most preferably, the site of attachment is such that, when the heat insulating barrier of the invention is laid out on a horizontal surface, the attachments alternate between the upper edges and the lower edges of the foam blocks. With this arrangement it is possible to fold or accordion pleat the thermal insulating barrier by sequentially bending the attachments of the individual blocks in alternating directions. Thus, those attachments which occur between the lower edges of the individual blocks when the insulating barrier is spread on a horizontal surface are flexed so that the lowermost surfaces of the block which come together at the attachment are brought into abutting relationship. The attachments which occur at the topmost edges of the blocks are flexed in the opposite direction so that the uppermost surfaces of the blocks which come together at the attachment are brought into abutting relationship. This method of folding, or accordion pleating, the various sealed blocks in the barrier results in a very compact and portable article which can be transported to the desired construction site and then stretched out to its original configuration for utilization in thermal insulation of the foundation.

In a less preferred mode of attaching the plurality of encased blocks together, the attachments are all made between the edges on the same side of the thermal insulating barrier when spread out on a planar surface. In this way, it is possible to flex all the attachments in the same direction and roll up the thermal insulation barrier of the invention like a carpet. This, however, results in somewhat less compactness and ease of handling than the pleat method described above.

The thermal insulating barriers of the invention are transported to the construction site in the compact form described above and are there installed in the desired location by unrolling or unfolding the compacted barrier. Usually the gaps between th abutting edges of individual blocks of the barrier, when unrolled or unfolded and placed in a horizontal plane, are so insignificant, in terms of their effect on the overall insulative effect of the barrier, as to be ignored. These gaps can, if desired, be minimized by applying appropriate pressure to bring the abutting edges of the blocks into closer relationship. This latter is greatly facilitated by making the connecting strips or attachments between blocks of highly flexible material so that said strip or attachement can be readily folded over or distorted into the shape of a loop thereby allowing the abutting edges of the foam blocks to come into touching relationship. This process can be further facilitated by locating the point of attachment of the connecting strips to the outer skin of the blocks at a slight distance from the edge of the block rather than at the edge itself.

If desired, however, the gaps between abutting edges of the blocks can be eliminated by application of an appropriate layer of sealer or adhesive or, in the case of gaps having a thickness of half an inch or more, by insertion of a strip of rigid cellular polymer encased in a skin of water-impermeable film. Said polymer foam can be the same as that employed in the blocks of the thermal insulation layer or a different one. The method of fabrication and encasement in the water-impervious film can be the same as those described above for the preparation of the thermal insulating barrier of the invention.

The thermal insulating barriers of the invention can be used in place of any of the thermal insulating barriers used in the art which have generally been fabricated *in situ* hitherto. The construction procedures employed before and after the installation of the thermal barriers of the invention can be the same as those hitherto employed in the art of building roads, runways, pipeline supports and the like on permafrost and other areas subject to the ravages of periodic thaw.

The portable thermal insulating barriers of the invention will now be described in more detail with particular reference to the drawings.

FIG. 1 shows a partially cutaway perspective view of a thermal insulating barrier (2) of the invention extended in a single plane. A plurality of rectangular polymer foam blocks (4) are held in parallel relationship one with another by an outer skin (6) of water-impervious flexible sheet material. Each of the individual foam blocks (4) is encased in form-fitting outer skin (6) and is hingably attached to its neighbors by flexible connecting strips (8) which are integral with the outer skin (6). The strips (8) alternately attach the two upper adjoining edges of neighboring foam blocks (4) and then the two lower adjoining edges of the next pair of neighboring foam blocks (4).

Figure 2:
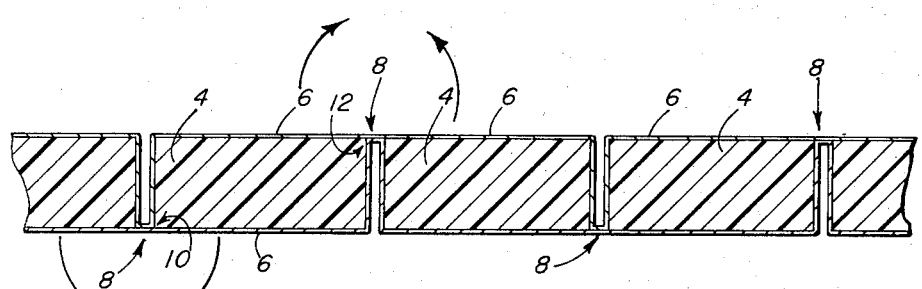
FIG. 2 is a partial cross-sectional view of a thermal insulating barrier of the invention.

The mode of encasement and attachment of the foam block (4) shown in FIG. 1 is seen in more detail in the partial cross-sectional view of FIG. 2. The outer skin (6) completely encases the foam block (4). Said outer layer (6) is fabricated from two flexible sheets placed on either side of the aligned blocks. The two sheets (6) are molded around the outer surface of the foam block (4) and are sealed together (by heat welding or appropriate sealants) at their common surface (8) and thereby hingably attach the block (4) to each of its immediate neighbors. The point of attachment (8) to its left-hand neighbor is at a diametrically opposite corner (10) to the corner (12) at which the point of attachment to its right-hand neighbor is made.

Figure 3:
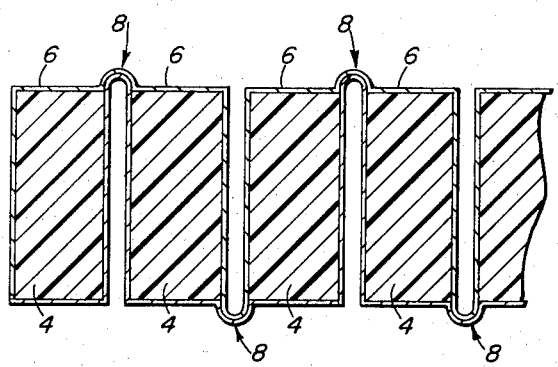
FIG. 3 is a cross-sectional view of a thermal insulating barrier of the invention in compacted form for storage and transportation.

By flexing the thermal barrier of the invention shown in partial cross-section in FIG. 2 at each joint in the direction of solid arrows, said thermal barrier is converted to a compact form which is shown in partial cross-section in FIG. 3.

Figure 4:
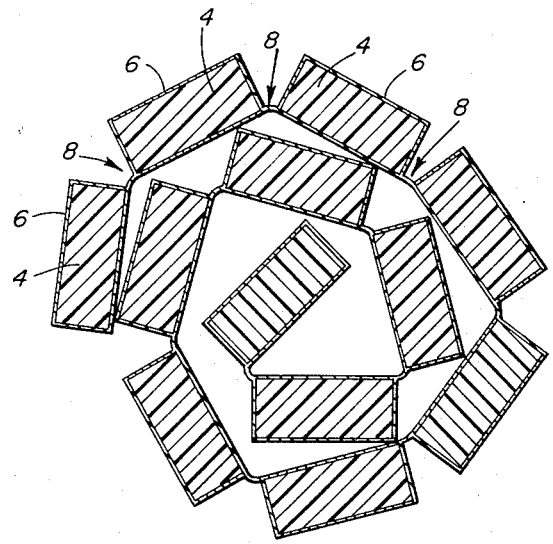
FIG. 4 is a cross-sectional view of another embodiment of a thermal insulating barrier of the invention in compacted form for storage and transportation.

FIG. 4 shows in cross-sectional form another embodiment of a thermal insulating barrier of the invention in compact form in which the attachments (8) between the neighboring blocks are to those corners of each block which share a common large interface and are not diametrically opposed to each other.

Figure 5:
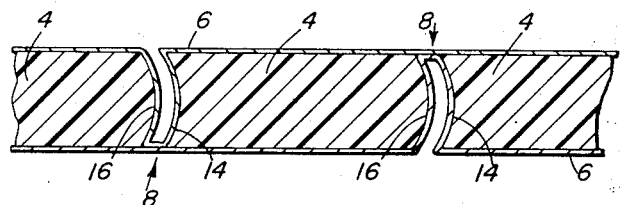
FIG. 5 is a partial cross-sectional view of yet another embodiment of a thermal insulating barrier of the invention.

FIG. 5 shows a cross-sectional partial view of a further embodiment of the invention in which the abutting edges of the foam blocks are curved, the edge (14) of one foam block (4) being concave in curvature and the corresponding abutting edge (16) of the next foam block (4) being convex in curvature so as to match the curvature of the mating edge.

Figure 6:
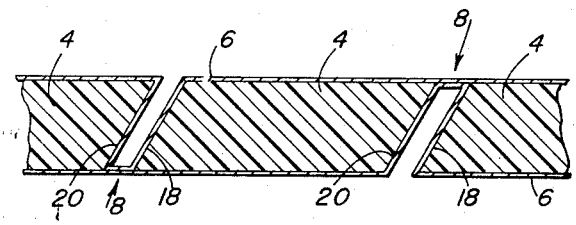
FIG. 6 is a partial cross-sectional view of still another embodiment of a thermal insulating barrier of the invention.

FIG. 6 shows a cross-sectional partial view of a yet further embodiment of the invention in which the abutting edges (18) and (20) of the foam blocks (8) are chamfered so that the gap between the blocks is in an inclined, rather than a vertical, plane when the thermal insulating barrier is placed horizontally.

Figure 7:
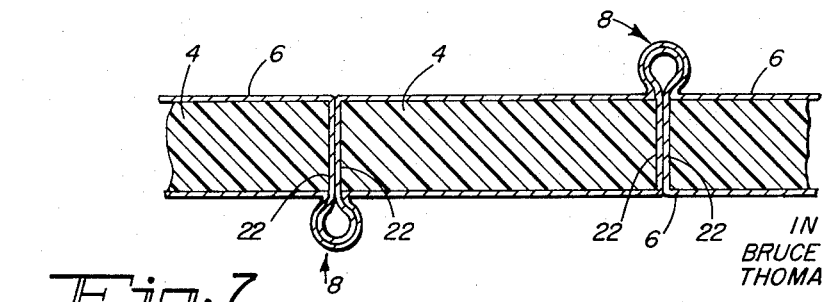
FIG. 7 is a partial cross-sectional view of another embodiment of a thermal insulating barrier of the invention.

FIG. 7 shows a modification of the embodiment shown in cross-sectional partial view in FIG. 2. In the modification shown in FIG. 7, the attachments (8) between the blocks are shown in elongated form and bent in the form of a loop so that the edges (22) of the neighboring foam blocks (4) can be brought into touching relationship.

What is claimed is:

1. A thermal insulating barrier which in convertible from a substantially planar configuration to a compacted portable form and which comprises in combination
   (a) a plurality of blocks of rigid cellular polymer;
   (b) each of said blocks being completely encased in individual envelopes of water-impervious film;
   (c) the said film of said envelopes comprising a hinge means on each side of each of said blocks thereby to flexibly and solely connect each of said blocks with an adjacent block on each side thereof;
   (d) the said hinge means being located at alternately and diametrically opposed corners of each individual block; and (e) the edges of said blocks thereby being held in abutting parallel relationship when said barrier is in substantially unfolded planar configuration.

References Cited

UNITED STATES PATENTS

| | | | |
|---|---|---|---|
| 3,544,417 | 12/1970 | Corzine | 161—50 |
| 3,117,902 | 1/1964 | Holzheimer | 161—36 X |
| 3,298,150 | 1/1967 | Ahlquist | 156—300 X |
| 3,192,099 | 6/1965 | Beckman et al. | 161—161 X |
| 3,649,398 | 3/1972 | Keith | 161—121 X |
| 3,528,875 | 9/1970 | MacDonald et al. | 156—210 X |

PHILIP DIER, Primary Examiner

U.S. Cl. X.R.

156—210, 300; 161—44, 121, 161